US012618367B2

(12) United States Patent (10) Patent No.: US 12,618,367 B2
Ackermann (45) Date of Patent: May 5, 2026

(54) OPEN ROTOR NOSE CONE RAM AIR HEAT EXCHANGER WITH EXHAUST OF COOLING AIR THROUGH STATIC STRUCTURE

(71) Applicant: RTX Corporation, Farmington, CT (US)

(72) Inventor: William K. Ackermann, East Hartford, CT (US)

(73) Assignee: RTX Corporation, Farmington, CT (US)

(*) Notice: Subject to any disclaimer, the term of this patent is extended or adjusted under 35 U.S.C. 154(b) by 0 days.

(21) Appl. No.: 18/934,682

(22) Filed: Nov. 1, 2024

(65) Prior Publication Data

US 2025/0154901 A1 May 15, 2025

Related U.S. Application Data

(60) Provisional application No. 63/597,444, filed on Nov. 9, 2023.

(51) Int. Cl.
*F02C 7/18* (2006.01)
*B64C 11/14* (2006.01)
*F01D 9/06* (2006.01)

(52) U.S. Cl.
CPC ............... *F02C 7/18* (2013.01); *B64C 11/14* (2013.01); *F01D 9/065* (2013.01); *F05D 2250/51* (2013.01); *F05D 2260/213* (2013.01)

(58) Field of Classification Search
CPC .......... F05D 2260/213; F05D 2260/20; F05D 2250/51; F01D 9/065; F01D 25/12; F01D 25/08; F01D 1/00; F02C 7/32; F02C 7/14; F02C 7/047; F02C 7/18; F28D 2001/0273; B64C 11/14
See application file for complete search history.

(56) References Cited

U.S. PATENT DOCUMENTS 9,828,914 B2  11/2017  Suciu et al.
9,920,708 B2  3/2018  Suciu et al.
(Continued)

FOREIGN PATENT DOCUMENTS

CN  114893299 A  8/2022
EP  3165451 A1  5/2017
GB  853723  11/1960

OTHER PUBLICATIONS

European Search Report for EP Application No. 24211923.8 dated Apr. 10, 2025.

*Primary Examiner* — Rodolphe Andre Chabreyrie
(74) *Attorney, Agent, or Firm* — Carlson, Gaskey & Olds, P.C.

(57) ABSTRACT

A gas turbine engine includes an open rotor configured to rotate with a nose cone. A heat exchanger is positioned within the nose cone and a system for using a working fluid. An inlet from the system is connected to the heat exchanger and an outlet from the heat exchanger connected back to the system. A central opening is in a central portion of the nose cone to deliver cooling air across the heat exchanger, and a duct downstream of the heat exchanger to direct the cooling air radially to at least one static opening such that the cooling air can move radially outwardly through static structure and be directed into a propulsion airflow path. A method and a heat exchange system are also disclosed.

16 Claims, 3 Drawing Sheets

(56)             References Cited

U.S. PATENT DOCUMENTS

| | | | |
|---|---|---|---|
| 10,060,350 B2 | 8/2018 | Suciu et al. | |
| 10,215,096 B2 * | 2/2019 | Suciu | F02C 7/04 |
| 2009/0060748 A1 * | 3/2009 | Landa | F03D 80/60 |
| | | | 416/93 R |
| 2011/0158808 A1 * | 6/2011 | Henze | B64C 11/14 |
| | | | 416/94 |
| 2011/0182723 A1 | 7/2011 | Rinjonneau et al. | |
| 2011/0268563 A1 | 11/2011 | Stretton | |
| 2013/0259639 A1 * | 10/2013 | Suciu | F01D 15/08 |
| | | | 415/117 |
| 2014/0216056 A1 * | 8/2014 | Schwarz | F02C 7/12 |
| | | | 415/178 |
| 2022/0259985 A1 | 8/2022 | DePuy et al. | |
| 2023/0055732 A1 * | 2/2023 | Devasigamani | B64D 27/24 |

* cited by examiner

OPEN ROTOR NOSE CONE RAM AIR HEAT EXCHANGER WITH EXHAUST OF COOLING AIR THROUGH STATIC STRUCTURE

CROSS-REFERENCE TO RELATED APPLICATIONS

This application claims the benefit of U.S. Provisional Patent Application No. 63/597,444 filed Nov. 9, 2023; the disclosure of which is incorporated by reference in its entirety herein.

BACKGROUND OF THE INVENTION

This application relates to a gas turbine engine having an open rotor propulsor, and a heat exchanger in a nose cone.

Gas turbines are known, and typically include a propulsor delivering air as propulsion external to a core engine, and also delivering air into the core engine. The air in the core engine passes into a compressor section. Compressed air is delivered into a combustor where it is mixed with fuel and ignited. Products of this combustion pass downstream over turbine rotors, driving them to rotate.

It is known that there are accessory systems associated with gas turbine engines. As an example, a lubrication system and cooling air systems are typically required. It is also known that the working fluid of those systems becomes hot and it is desirable to provide a heat exchanger to cool the working fluid.

One type of turbine engine utilizes a fan (e.g., turbofan). A fan is provided with an outer housing, and thus the propulsion air flows into a bypass duct defined by the outer housing and an inner housing. This bypass air may be a source of cooling air for a heat exchanger as it is pressurized.

However, another type of gas turbine engine utilizes an open rotor propulsor and, with such a system, obtaining cooling air can be a challenge. The air is not pressurized due to the absence of an outer housing.

SUMMARY OF THE INVENTION

In a featured embodiment, a gas turbine engine includes an open rotor configured to rotate with a nose cone. A heat exchanger is positioned within the nose cone and a system for using a working fluid. An inlet from the system is connected to the heat exchanger and an outlet from the heat exchanger connected back to the system. A central opening is in a central portion of the nose cone to deliver cooling air across the heat exchanger, and a duct downstream of the heat exchanger to direct the cooling air radially to at least one static opening such that the cooling air can move radially outwardly through static structure and be directed into a propulsion airflow path.

In another embodiment according to the previous embodiment, the open rotor is driven by a gear reduction such that it rotates at a slower speed than a propulsor drive turbine of the gas turbine engine.

In another embodiment according to any of the previous embodiments, the central opening in the nose cone directs air into a diffuser.

In another embodiment according to any of the previous embodiments, further including an exit manifold downstream of the heat exchanger.

In another embodiment according to any of the previous embodiments, downstream of the exit manifold the cooling air is connected into a connecting duct which turns it in a radially outward direction.

In another embodiment according to any of the previous embodiments, a swirl recovery vane is positioned downstream of the open rotor on an outer housing enclosing a core engine including a propulsor drive turbine of the gas turbine engine.

In another embodiment according to any of the previous embodiments, the at least one static opening is in the swirl recovery vane.

In another embodiment according to any of the previous embodiments, the at least one static opening includes a plurality static openings in the swirl recovery vane.

In another embodiment according to any of the previous embodiments, at least one of the plurality of static opening is located at a radially outer end of the swirl recovery vane.

In another embodiment according to any of the previous embodiments, further includes a compressor section and a turbine section. The outer housing surrounds the compressor section and the turbine section and the at least one static opening is located in the outer housing.

In another embodiment according to any of the previous embodiments, the at least one static opening is downstream of the open rotor.

In another embodiment according to any of the previous embodiments, the cooling air is connected through static struts radially inward of the outer housing.

In another embodiment according to any of the previous embodiments, further includes a door operable to selectively block airflow into the central opening in a closed position, or allow airflow into the central opening in an open position.

In another embodiment according to any of the previous embodiments, an actuator drives the door between the open and closed positions.

In another embodiment according to any of the previous embodiments, the heat exchanger is a at least one of rectangular, circular, arc-shaped or cylindrical.

In another embodiment according to any of the previous embodiments, the heat exchanger is cylindrical and includes a central channel through which ambient air is received and passed through the heat exchanger.

In another embodiment according to any of the previous embodiments, the heat exchanger is cylindrical and has an outer wall that surrounds an inner cylinder, with a flow channel defined between the inner cylinder and the outer wall.

In another featured embodiment, a method of operating a gas turbine engine includes the steps of driving a gas turbine engine to rotate a nose cone, the nose cone having a central opening, passing a working fluid through a heat exchanger received in the nose cone, passing air into the central opening and across the heat exchanger to cool the working fluid and passing the air downstream of the heat exchanger outwardly through static structure on the gas turbine engine.

In another featured embodiment, a heat exchange system for an open rotor gas turbine engine, the heat exchange system includes a heat exchanger positioned within a nose cone of the open rotor gas turbine engine and a use for using a working fluid. An inlet from the use is connected to the heat exchanger and an outlet from the heat exchanger is connected back to the use. A central opening in a central portion of the nose cone delivers cooling air across the heat exchanger. A duct downstream of the heat exchanger directs the cooling air radially to at least one static opening in a static structure such that the cooling air can move radially outwardly through the at least one static opening static structure and be directed into a propulsion airflow path.

In another embodiment according to any of the previous embodiments, the at least one static opening is in a swirl recovery vane of the open rotor gas turbine engine or in an outer housing that surrounds a compressor, a combustor, and a turbine of the open rotor gas turbine engine.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figures 1A, 1B:
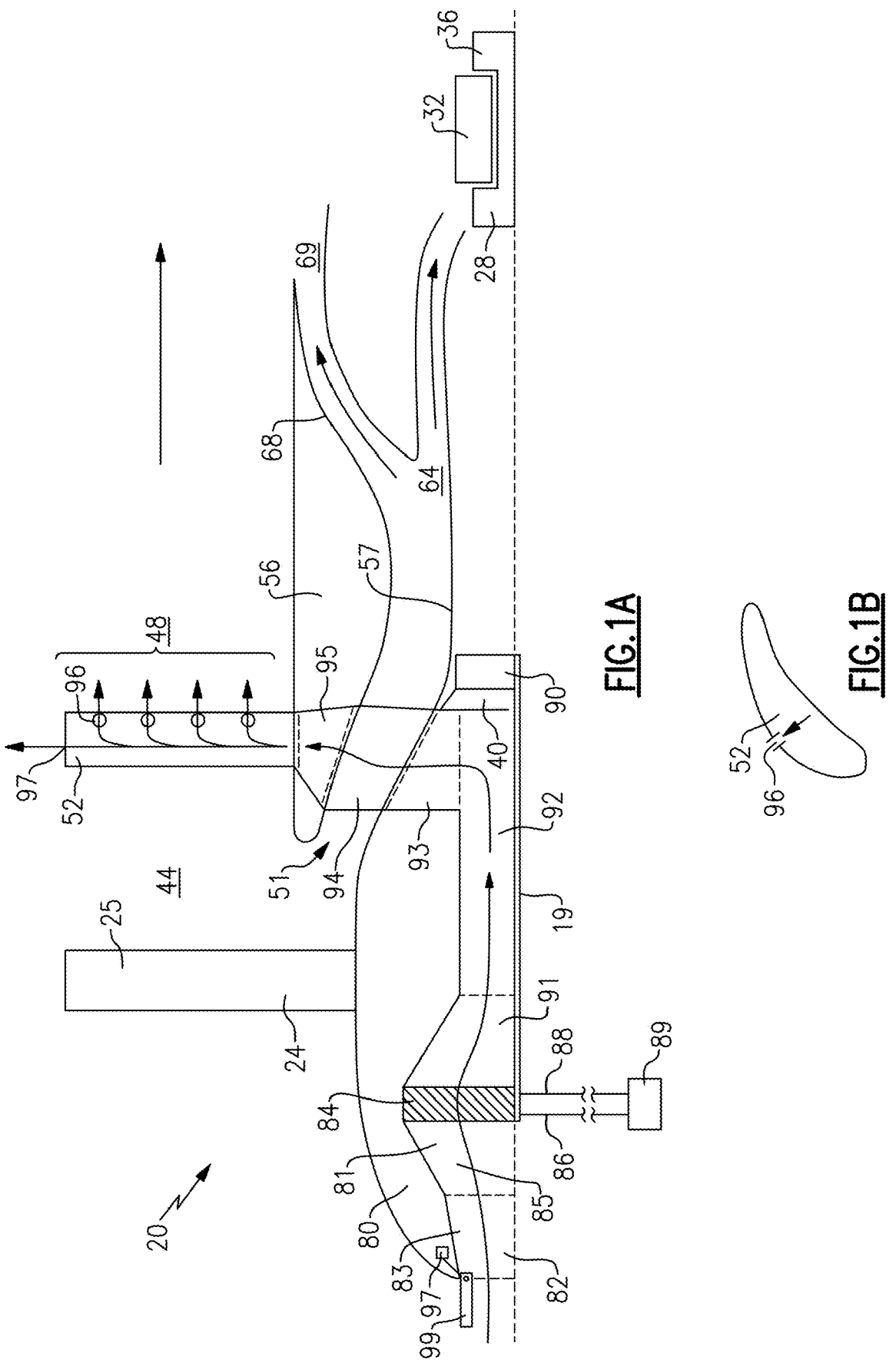
FIG. 1A shows a first embodiment of an open-rotor gas turbine engine.
FIG. 1B shows a feature of the first embodiment.

FIG. 1A schematically illustrates portions of a turbo prop or open-rotor gas turbine engine 20 for rotation about an engine central longitudinal axis A. The gas turbine engine 20 generally incorporates an open rotor propulsor or rotor 24. Notably, as would be appreciated by a person of ordinary skill in the art having the benefit of this disclosure, a turbo prop gas turbine engine does not include a fan case or a bypass duct outward of the rotor 24.

An open rotor propulsor is defined for purposes of this application as an array of propeller blades that has no housing radially outward of a plurality of blades 25 in the array. The use of such a design allows the blades 25 outer diameter to increase significantly, with an associated reduction in propulsor pressure ratio across the blades 25. Further, such engines can be adapted to more radical swept-blade wing shapes. These benefits would become difficult to achieve with a fan having an outer fan case.

The rotor 24 is connected to a geared architecture 40 to drive the rotor 24 at a lower speed than the speed of a fan drive turbine. In other examples, the rotor 24 can be a direct drive rotor (e.g., without the geared architecture 40), such as direct drive from a power turbine.

A compressor section 28, combustor 32 and turbine section 36 are all shown schematically. As known, each of the compressor section and turbine section may include two distinct rotors. A lower speed compressor rotor is driven by a low speed turbine and may be connected to drive the geared architecture 40 to in turn drive the rotor 24. The details of the drive connections may be as known. As known, there may also be a high pressure compressor and turbine.

The rotor 24 may drive ambient air 44 in a downstream direction along a propulsion flow path 48 and also into an inner flow path 51. Air exiting the rotor 24 may pass along an exit guide vane 52 to generate propulsion thrust. Although not illustrated, exit guide vane 52 has an airfoil shape to direct the air moving downstream (see FIG. 1B, described below). The air entering the inner flow path flows inboard of a splitter structure composed of the outer core panel 56 and an inner wall 57. The air in the inner flow path then divides into a core flowpath 64 for compression via compressor 28 and into an optional auxiliary flowpath 68 ultimately leading to an exit 69 for additional propulsion thrust. This auxiliary flowpath may be used for a variety of purposes, including additional cooling capability.

A static gear housing 90 is shown for the geared architecture 40.

As mentioned above, it may be a challenge to obtain cooling air to cool engine systems, such as an environmental control system as well as other air and lubrication systems. In the past, the fan stream bypass air was used as a cooling source, such as with heat exchangers mounted in the bypass duct.

However, the supply of cooling air is much more challenging with an open rotor design as there is effectively no working static pressure due to the absence of an outer fan case. In addition, the available dynamic pressure is small due to the lower Fan Pressure Ratios (FPR's) of open-rotor designs.

To address these challenges with an open rotor design, the engine 20 illustrated in FIG. 1A uses ram air to pass thru a stationary heat exchanger inside a rotating nose cone 80. The arrangement can be used to provide cooling whenever the aircraft is in flight where a suitable Mach Number (Mn) exists. However, it is most effective at conditions typical at high altitude flight. There is a large opening 82 in the center of the nose cone or spinner 80 to allow cold ambient air into the interior chamber 81 of the nose cone 80. The opening 82 may be circular, rectangular, ovular, or any other shape. Additionally, the opening 82 may be shaped as a scoop, such as to funnel air into the opening 82. In some embodiments the nose cone 80 may be configured with a door 99 that is adjustable between a closed position (e.g., to reduce system drag) and an open position to allow air to flow through the opening 82 and into the interior chamber 81 for cooling. An actuator 197 for the door 99 is shown schematically. The door 99 could be mounted at downstream locations in the cooling air flow path The air flows through a diffuser 83 and an inlet manifold 85 which together form the interior chamber 81. The air then passes thru a heat exchanger 84. Heat exchanger 84 is shown mounted at 19 to the static gear housing 90.

The heat exchanger may be a plate fin-type, a tube shell-type, or any other type of heat exchanger. As shown schematically, an engine system 89, which may be a supplemental ECS system, an oil lubricant system, an air buffer system, or any other system that provides a working fluid through an inlet 88 to the heat exchanger 84. From the heat exchanger 84, the working fluid is cooled by the cooling air passing from the opening 82 across the heat exchanger 84. The working fluid then returns through line 86 to the system 89.

The spent cooling air downstream of the heat exchanger 84 passes into an exit manifold 91 and is ducted rearwardly through duct 92 into a sector or full-hoop manifold 93 at the base of the front center body (FCB) struts 94. Note that manifold 93 is static relative to the nose cone 80. The spent cooling air in manifold 93 then passes through the FCB struts 94, some/all of which are hollow, and into another sector or full-hoop manifold 95 at a base of the swirl recovery vanes (SRV) 52, some/all of which are also hollow. From here the air then flows radially outwardly through one or more of these hollow SRV's and exits via holes 96 that are located on the suction (lower-pressure) side of the airfoil angled so as to inject the spent air near-parallel to the local-most aero streamline to minimize mixing losses. Additional optional holes 97 may exist at a radially outer tip to handle larger flowrates if needed. A side-benefit of this configuration is that the heated spent air will provide some level of anti-icing to the swirl recovery vane 52.

FIG. 1B shows that the swirl recovery vane 52 has an airfoil shape, as known.

Figure 1C:
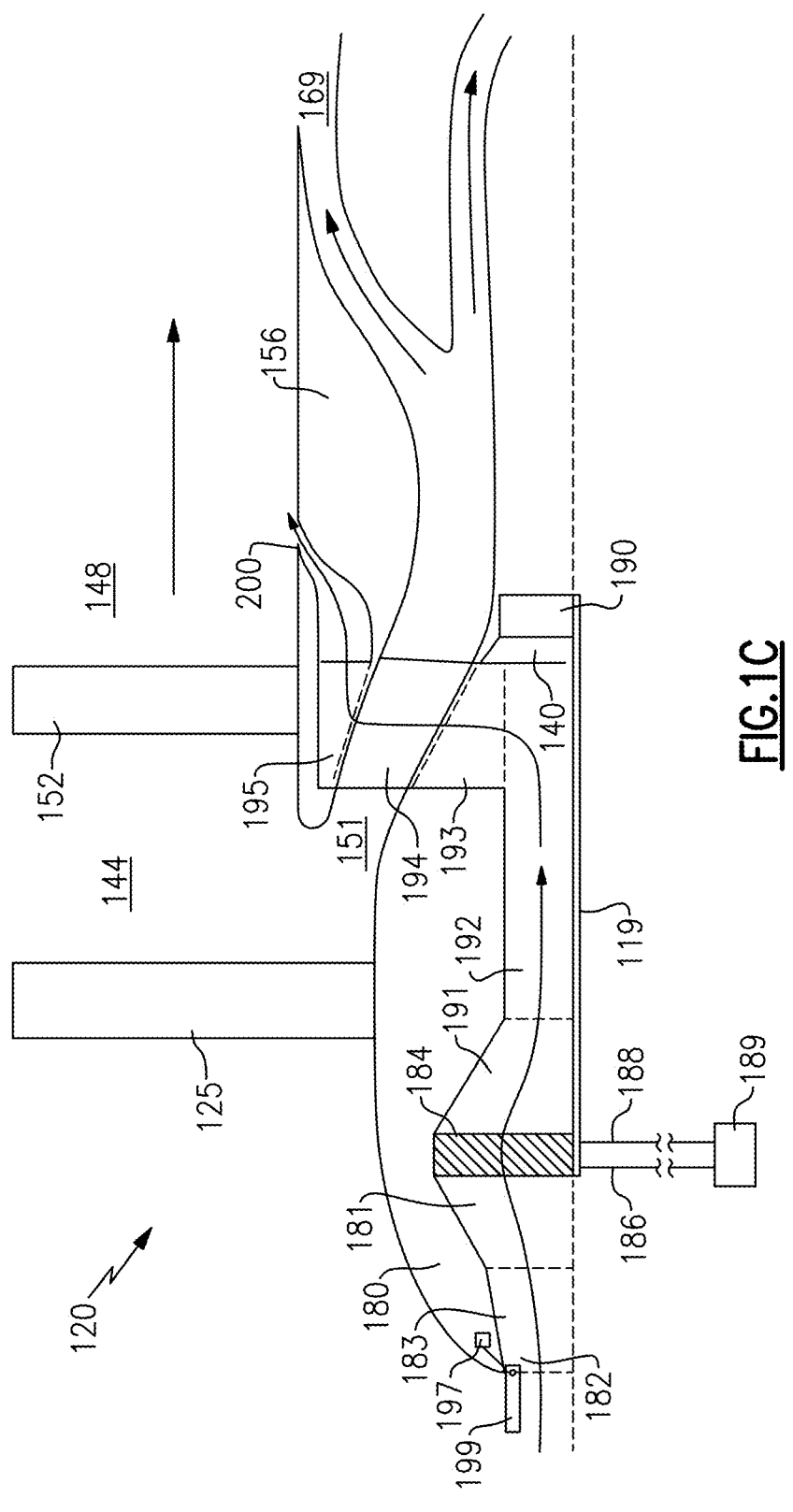
FIG. 1C shows a second embodiment.

FIG. 1C shows a second embodiment 120. Components that are common with the FIG. 1A embodiment are simply identified with 100 added to their identifying numeral. After passing over the heat exchanger 184 the air is collected via an exit manifold 191 and then ducted rearwardly through a connecting duct 192 and into a fixed inlet manifold 193. From manifold 193 the air passes outwardly through static FCB struts 194 and into a second manifold 195. From manifold 195 the spent air flows through an outlet 200 rearward of the swirl recovery vane 152 located along the fanstream ID surface. Outlet 200 is configured to inject the flow at a low radial incidence angle along the fanstream ID wall in order to minimize any associated pressure losses caused by inefficient mixing, thereby maximizing system thruflow.

HEXsys DP=Pup−Pdn=DPram. Note that this equation is approximately valid for both embodiments illustrated in FIGS. 1A and 1C.

In this formula, HEXsys DP is a delta pressure across the entire heat exchange system. Pup equals system inlet pressure equals Pamb+DPram. DPram is the ram pressure effect of the air due to the aircraft Mach Number (Mn) Pdn equals system dump pressure equals Pamb.

A gas turbine engine under this disclosure could be said to include an open rotor configured to rotate with a nose cone. A fixed, non-rotating heat exchanger is positioned within or proximate to the nose cone and supported via a static gear housing, which may be located further rearward. There also exists a piping system that uses working fluid, either oil or air. An inlet from the piping system is connected to the heat exchanger and an outlet from the heat exchanger is connected back to the system.

A central opening in the nose cone delivers cooling air to the front face of the heat exchanger via an inlet manifold. A diffuser may be added to slow the velocity of the inlet air, thereby efficiently increasing its static pressure. A downstream exit manifold is used to collect the spent cold-side air once it exits the heat exchanger and directs it rearward to a static front center body structure that supports the fan gear housing. The spent cooling air is then guided radially across the core stream, though one or more of the hollow FCB struts, and into a partial or full annular manifold. The spent air can then be dumped into the fanstream in a variety of ways.

One way is to inject the flow at a low radial incidence angle along the fanstream ID wall in order to minimize any associated pressure losses caused by inefficient mixing, thereby maximizing system thruflow (as illustrated in FIG. 1C). Another is to funnel the flow into one or more static hollow SRV's and spread it over the entire radial span of the fanstream via strategically-placed holes (as illustrated in FIG. 1A).

A benefit of the FIG. 1A embodiment 20 compared to the FIG. 1C embodiment 120 is that the airflow out of the one or more holes 96 does not scrub any downstream hardware (e.g., does not come into contact with any hardware downstream of the SRV 52). The FIG. 1C embodiment that exits at location 200 scrubs the fanstream ID surface which would be configured to handle the increased temperature associated with the spent cooling air.

Figure 2A:
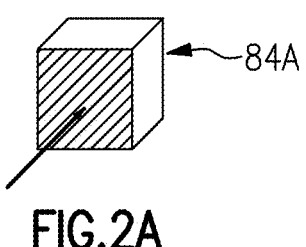
FIG. 2A shows a first heat exchanger arrangement.

In the illustrative example of FIG. 2A, the heat exchanger 84A is square and includes a corresponding profile where ambient air of the chamber 81, 181 is guided thru the heat exchanger 84A.

Figure 2B:
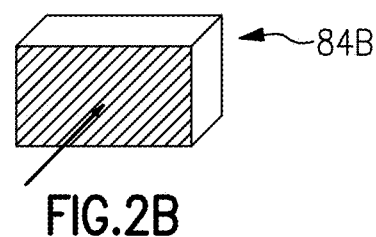
FIG. 2B shows a second heat exchanger arrangement.

In the illustrative example of FIG. 2B, the heat exchanger 84B is rectangular and includes a corresponding profile where ambient air from chamber 81, 181 is guided thru the heat exchanger 84B.

Figure 2C:
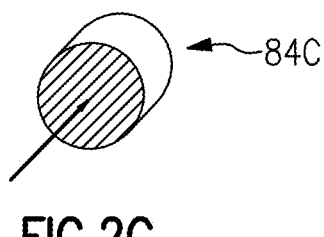
FIG. 2C shows a third heat exchanger arrangement.

In the illustrative example of FIG. 2C, the heat exchanger 84C is circular and includes a corresponding profile where ambient air from the chamber 81, 181 is guided thru the heat exchanger 84C.

Figure 2D:
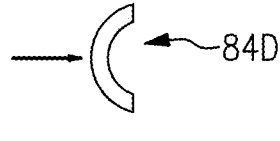
FIG. 2D shows a fourth heat exchanger arrangement.

In the illustrative example of FIG. 2D, the heat exchanger 84D is arc-shaped and includes a corresponding profile where ambient air from the chamber 81, 181 is guided thru the heat exchanger 84D.

Figure 2E:
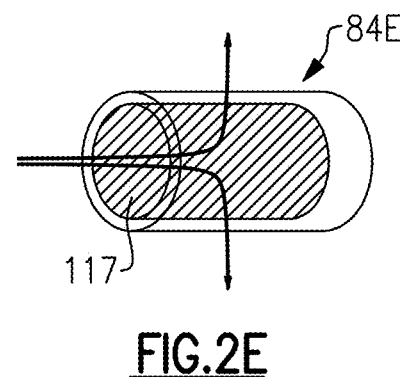
FIG. 2E shows a fifth heat exchanger arrangement.

In the illustrative example of FIG. 2E, the heat exchanger 84E is cylindrical and includes a central channel 117 through which ambient air from the chamber 81, 181 is received and passed through the heat exchanger 84E.

Figure 2F:
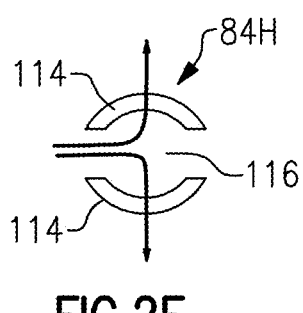
FIG. 2F shows a sixth heat exchanger arrangement.

FIG. 2F shows a heat exchanger embodiment 84H. There are two arc portions 114. The air here passes into a central chamber 116, and then outwardly across the arc portions. Similar to the FIG. 2E embodiment, the air enters a central portion between the arc portions 114 and passes over them.

Figure 2G:
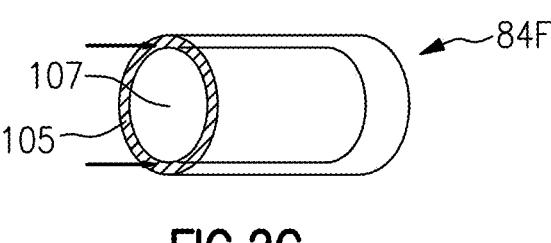
FIG. 2G shows a seventh heat exchanger arrangement.

In the illustrative example of FIG. 2G, the heat exchanger 84F is cylindrical and includes a channel 105 through which ambient air from the chamber 81, 181 is received and passed through the heat exchanger 84F. The channel 105 is generally defined between an inner cylinder 107 and an outer wall that surrounds the inner cylinder.

Figure 2H:
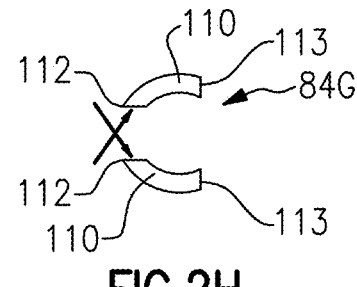
FIG. 2H shows an eighth heat exchanger arrangement.

FIG. 2H shows an embodiment wherein the heat exchanger 84G includes two arc portions 110. Air is shown passing into an end 112 of the arc portions 110 to cool the working fluid. Here the air flows through the arc portions 110 from end 112 to ends 113.

A gas turbine engine under this disclosure could be said to include an open rotor without an outer housing (e.g., open rotor architecture), and rotating with a nose cone. A static heat exchanger is positioned within the nose cone. There is a system for using a working fluid. An inlet from the system is connected to the heat exchanger and an outlet from the heat exchanger is connected back to the system. A central opening in a central portion of the nose cone delivers cooling air across the heat exchanger. A duct downstream of the heat exchanger directs the cooling air radially to at least one static opening such that the cooling air can move radially outwardly through static structure and be directed into a propulsion airflow path.

A method of operating a gas turbine engine under this disclosure may include the steps of 1) driving a gas turbine engine to rotate a nose cone, the nose cone having a central opening; 2) passing a working fluid through a heat exchanger received in the nose cone; 3) passing air into the central opening and across the heat exchanger to cool the working fluid; and 4) passing the air downstream of the heat exchanger outwardly through static structure on the gas turbine engine.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. A gas turbine engine comprising: an open rotor configured to rotate with a nose cone, the open rotor having propeller blades with no housing radially outward of the propeller blades; a heat exchanger positioned within the nose cone and a system for using a working fluid, an inlet from the system connected to the heat exchanger and an outlet from the heat exchanger connected back to the system; and a central opening in a central portion of the nose cone to deliver cooling air across the heat exchanger, and a duct downstream of the heat exchanger to direct the cooling air radially to at least one static opening such that the cooling air moves radially outwardly through a static structure and be directed into a propulsion airflow path, wherein the at least one static opening is in a swirl recovery vane of the open rotor on an outer housing.

2. The gas turbine engine as set forth in claim 1, wherein the open rotor is driven by a gear reduction such that the open rotor rotates at a slower speed than a propulsor drive turbine of the gas turbine engine.

3. The gas turbine engine as set forth in claim 1, wherein the central opening in the nose cone directs air into a diffuser.

4. The gas turbine engine as set forth in claim 1, further comprising an exit manifold downstream of the heat exchanger.

5. The gas turbine engine as set forth in claim 4, wherein downstream of the exit manifold the cooling air is connected into a connecting duct which turns the cooling air in a radially outward direction.

6. The gas turbine engine as set forth in claim 1, wherein the swirl recovery vane is positioned downstream of the open rotor on the outer housing enclosing a core engine including a propulsor drive turbine of the gas turbine engine.

7. The gas turbine engine as set forth in claim 1, wherein the at least one static opening comprises a plurality of static openings in the swirl recovery vane.

8. The gas turbine engine as set forth in claim 7, wherein at least one opening of the plurality of static openings is located at a radially outer end of the swirl recovery vane.

9. The gas turbine engine as set forth in claim 1, further comprising: a compressor section; and a turbine section; wherein the outer housing surrounds the compressor section and the turbine section.

10. The gas turbine engine as set forth in claim 9, wherein the at least one static opening is downstream of the open rotor.

11. The gas turbine engine as set forth in claim 9, wherein the cooling air is connected through static struts radially inward of the outer housing.

12. The gas turbine engine as set forth in claim 1, further comprising a door operable to selectively block airflow into the central opening in a closed position, or allow airflow cooling air into the central opening in an open position.

13. The gas turbine engine as set forth in claim 12, wherein an actuator drives the door between the open and closed positions.

14. The gas turbine engine as set forth in claim 1, wherein the heat exchanger is at least one of:
rectangular;
circular;
arc-shaped; or
cylindrical.

15. The gas turbine engine as set forth in claim 1, wherein the heat exchanger is cylindrical and includes a central channel through which the cooling air is received and passed through the heat exchanger.

16. The gas turbine engine as set forth in claim 1, wherein the heat exchanger is cylindrical and has an outer wall that surrounds an inner cylinder, with a flow channel defined between the inner cylinder and the outer wall.

* * * * *